United States Patent [19]

Carlson

[11] 3,954,241
[45] May 4, 1976

[54] LEVELING ASSEMBLY

[75] Inventor: John A. Carlson, Wichita, Kans.

[73] Assignee: Conchemco, Incorporated, Lenexa, Kans.

[22] Filed: Mar. 31, 1975

[21] Appl. No.: 563,774

[52] U.S. Cl............................. 248/188.3; 248/188.8
[51] Int. Cl.² ........................................ F16M 11/24
[58] Field of Search........... 248/188.1, 188.2, 188.3, 248/188.5, 188.8, 188.9, 19, 23, 188.4; 108/147

[56] References Cited
UNITED STATES PATENTS

| | | | |
|---|---|---|---|
| 280,593 | 7/1883 | Farmer | 248/188.9 |
| 1,396,661 | 11/1921 | Parr | 248/188.9 |
| 2,852,883 | 9/1958 | Walsh | 248/188.9 |
| 2,940,297 | 6/1960 | Mayer | 248/23 |

*Primary Examiner*—Rod D. Frazier
*Assistant Examiner*—Robert A. Hafer
*Attorney, Agent, or Firm*—Schmidt, Johnson, Hovey & Williams

[57] ABSTRACT

A self-adjusting assembly is adapted especially for facilitating the leveling of an appliance, such as a washing machine or the like, on an uneven floor in order that the appliance is firmly positioned thereon. A pair of mounting brackets are each provided with a vertically shiftable, floor-engaging leg member with the leg members being interconnected by a cable such that the leg members are free to shift vertically relative to their corresponding brackets and in a reciprocal relationship when not supporting a normal proportional share of the weight of the appliance. Structure is provided on each bracket to frictionally engage the cable and lock the same to prevent shifting movement of the leg members relative to their brackets when the leg members and a pair of cooperating adjustable legs on opposite corners of the appliance are all in normal contact with the floor in support of the appliance.

5 Claims, 5 Drawing Figures

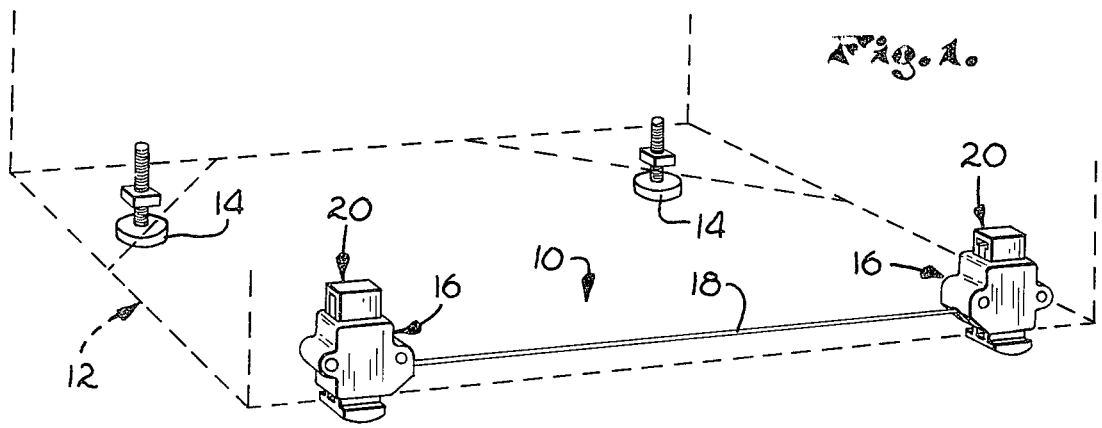
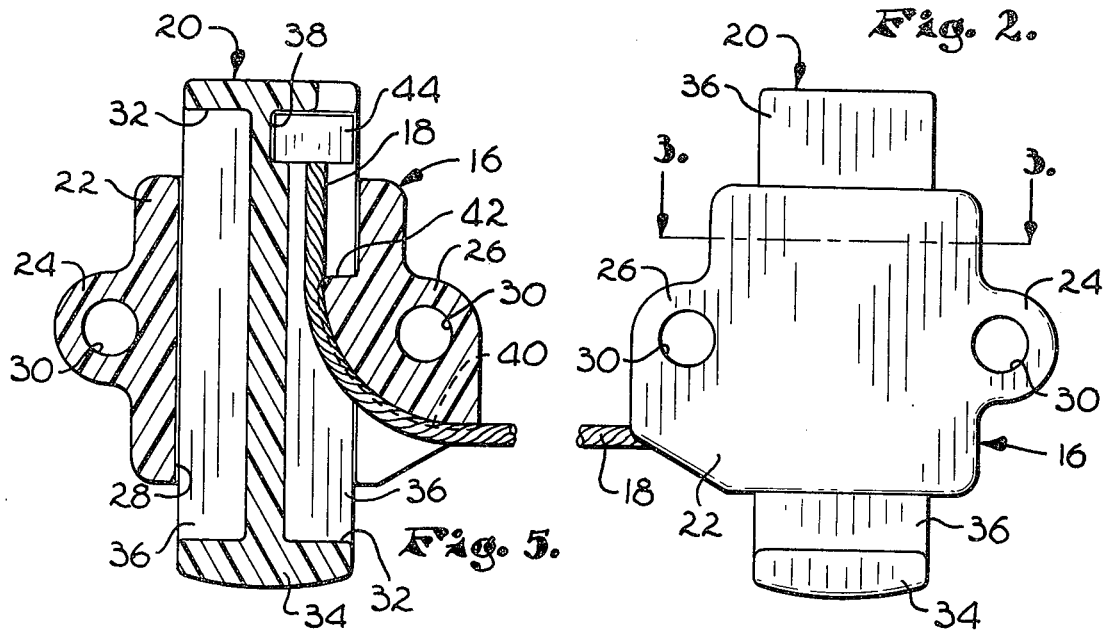
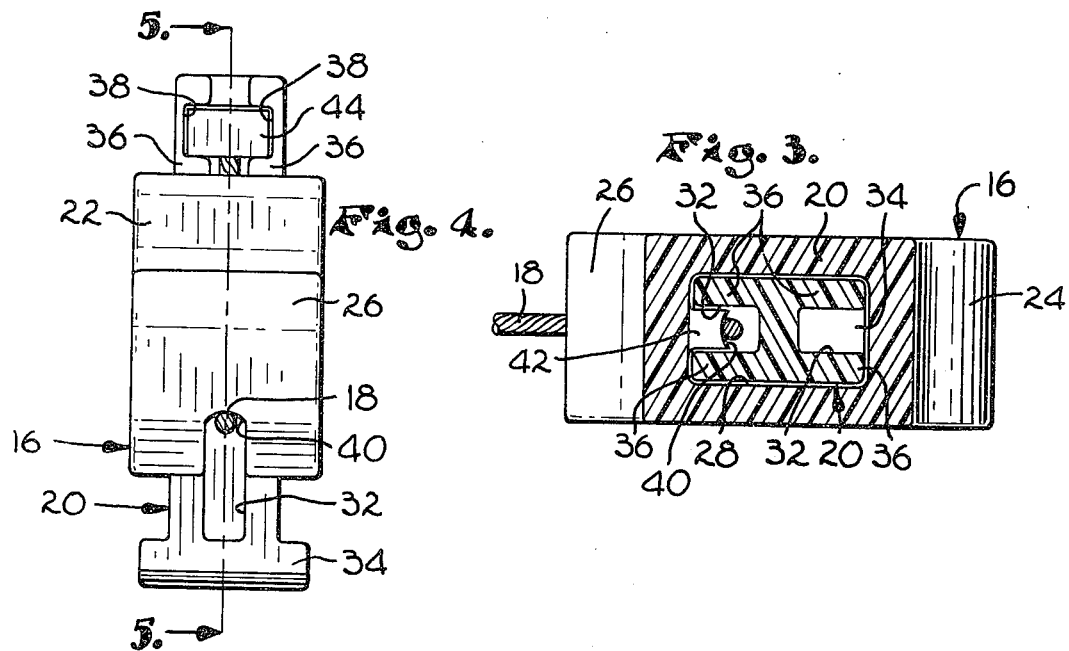

LEVELING ASSEMBLY

This invention relates to an assembly for adjusting the four legs or feet of an appliance, such as a washing machine or the like, to ensure that the appliance is firmly supported on a floor surface by all four of the feet. A problem encountered with many appliances, such as the aforementioned washing machine, is that of controlling the tendency for the machine to move or "walk" in response to vibrations that occur during operation thereof. This problem usually occurs when there are variations in floor flatness and the appliance is not firmly positioned with all four feet fully supporting their proportional share of the weight.

Numerous other problems are likely to occur when the appliance is allowed to "walk" uncontrolled, among them being a further intensity in vibration which may result in premature failure of a component, damage to the floor surface, or dents and scratches on the finish of the appliance or adjacent objects as a result of the appliance bumping into or vibrating thereagainst. Additionally, the size of appliances of this type is usually such that it is difficult to easily have access to the support legs and, therefore, it is frequently rather difficult to manually adjust the support legs properly to conform to the variations in the floor surface upon which the appliance is resting.

It is therefore a very important object of my invention to provide a self-adjusting assembly for facilitating the leveling of appliances such as washing machines.

A further significant object of the invention is to provie an appliance leveling assembly which will resist change when the proper weight distribution has been applied thereto and the appliance positioned in a stable condition.

Yet another important object of the invention is to provide an appliance leveling assembly that readily adjusts itself to conform to variations in the floor surface without the use of manual procedures or any tools.

Another object of the invention is to provide an appliance leveling assembly that may be easily adapted for mounting on various appliances having different structural configurations and which may be readily constructed to fit the particular application.

A still further object of the invention is to provide a leveling device for appliances that is relatively low in cost, is easily produced using mass production techniques, and has relatively few components.

In the drawing:

FIG. 1 is a fragmentary, perspective view illustrating the appliance leveling assembly of the present invention in connection with an appliance, such as a washing machine, shown by broken lines;

FIG. 2 is an enlarged, side elevational view of one of the pair of brackets of the leveling assembly;

FIG. 3 is a cross-sectional view taken along line 3—3 of FIG. 2;

FIG. 4 is an end elevational view of the bracket shown in FIG. 2; and

FIG. 5 is a cross-sectional view taken along line 5—5 of FIG. 4.

An assembly 10 is adapted especially to facilitate leveling of an appliance 12, such as a washing machine or the like, having a pair of conventional, independently adjustable legs 14 located at the front, lower corners of the appliance 12. Broadly comprising the assembly 10 are a pair of brackets 16 located at the two rearmost, lower corners of the appliance 12, and a flexible cable element 18 extending from one bracket 16 to the other and interconnecting respective leg members 20 associated with each bracket 16.

Inasmuch as the brackets 16 are identical, the description of one is to be understood to apply equally to the other. Each bracket 16 is comprised of a main body portion 22 having a pair of mounting bosses 24 and 26 on opposite sides and a longitudinal, rectangular bore 28 extending in a normally vertical direction through the body 22 and perpendicular to a pair of mounting holes 30 in the bosses 24 and 26 respectively.

The leg member 20 presents an upright, generally rectangular shape in which a pair of vertical, opposed, longitudinal channels 32 have been formed terminating just short of each end of the member 20 such that a horizontally disposed H-shaped cross-sectional configuration is presented as shown in FIG. 3. The lower end of the member 20 defines a floorengageable pad 34 while the two upright longitudinal branches 36 defined by the channel 32 proximal the boss 26 are provided with opposed notches 38 adjacent the upper end of the member 20.

Incorporated in the body 22 in the vicinity of the boss 26 is structure presenting a generally upright, longitudinally arcuate, cable-receiving groove 40 with that portion of the body 22 protruding into the adjacent channel 32 defining an abutment 42 for a fitting 44 suitably secured to the corresponding end of the cable 18. There is a fitting 44 at each end of the cable 18 with each fitting 44 being horizontally retained in the notches 38 of their respective leg members 20 and extending across the proximal channel 32. The leg member 20, the body 22 and the fitting 44 may be made of any suitable material such as high-grade plastic and may be formed by an injection molding process for relatively low cost, high quantity producton.

In operation, the assembly 10 is secured to an appliance 12 through the use of fasteners (not shown) utilizing the holes 30 in the bosses 24 and 26 respectively, such that a bracket 16 is located, preferably, at each lower, rear corner of the appliance. The cable 18, with its fitting 44, is of a predetermined length suitable for the particular appliance to which the assembly 10 is affixed so that there is no excess length with regard to the cable itself. Rather, the length of the cable is just sufficient to each from one bracket 16 to the other with substantially no free extra length therebetween, it being understood that the fittings 44 have been seated in their corresponding notches 38 prior to installation of the individual brackets 16 on the appliance 12.

Thus, when the appliance has been tilted such that no appreciable weight thereof is bearing down on the brackets 16, the respective leg members 20 are freely movable up and down within their bracket 16 and along the bores thereof with the leg members 20 moving in a mutual, reciprocal relationship relative to each other. Then, as the appliance is positioned on its supporting surface or floor, the leg members 20 will self-adjust for any unevenness by one leg member 20 moving up while the opposite leg member 20 moves down, each seeking their own relative level as defined by the uneven floor surface.

While the legs 20 must be easily and freely movable during placement of the appliance, they must then resist movement after the appliance has been placed in operation. Thus, as the weight of the appliance is brought to bear on the legs 20 and they have assumed their relative dispositions in the brackets 16, the friction developed between the cable 18 and the brackets 16 along the grooves 40 prevents further shifting of the cable relative thereto and, consequently, further shifting of the leg members 20. The friction is proportional to the weight of the appliance and can also be controlled by the shaping of the grooves to obtain more or less locking action. That is to say, if the transverse contour of the groove 40 is such that a relatively large surface area of the cable adjacent thereto is in contact with the bracket, more holding action is achieved than would be the case if only a relatively small part of the aforementiond surface area were in contact with the groove surface.

It is to be understood that the basic leveling of the entire appliance is then accomplished in a conventional manner by manually adjusting the threaded front leg supports 14 in the usual manner. It will then be seen that there is proper weight distribution on each of the four legs of the appliance in order that the same is stably positioned and not susceptible to the normal operational vibrations which would otherwise cause the appliance to "walk" during operation were not all four legs properly in contact with the floor surface and not supporting their proportional amount of weight.

While the particular configurations of the brackets 16 and the legs 20 are preferred, other configurations might be used which adapt the brackets for attachment to horizontal surfaces rather than to an upright surface such as shown. Furthermore, while an H-shaped leg is shown, other configurations can also be utilized such as round, cylindrical-type legs having a single upright groove or longitudinal channel provided therein corresponding to a channel 32 in the illustrated embodiment for clearance of the cable 18. It is to be understood that the relative locations of the assembly 10 and the independently adjustable legs 14 can be modified to suit the application and need not be in the back and front respective locations as herein presented.

Having thus described the invention, what is claimed as new and desired to be secured by Letters Patent:

1. A leveling assembly for appliances or the like, said assembly comprising:
   a pair of brackets adapted to be secured to the appliance,
   each bracket having a leg member freely shiftable vertically relative thereto and engageable with a floor surface beneath the appliance;
   connecting means extending from one bracket to the other and interconnecting said leg members with each other for mutual movement thereof,
   each leg member being free to shift vertically relative to its corresponding bracket and in a reciprocal relationship with its associated member when substantially none of the weight of the appliance is supported thereby; and
   structure incorporated with each bracket and disposed to be in frictional engagement with said connecting means to lock the same and prevent shifting movement of said leg members relative their brackets when both leg members are in contact with the floor in support of at least a portion of the weight of the appliance.

2. As assembly as claimed in claim 1, wherein said connecting means is an elongate, flexible tension element stretched between said two leg members.

3. An assembly as claimed in claim 2, wherein said structure includes a longitudinally arcuate, element-receiving groove disposed to grip said element when the latter is under tension.

4. A leveling assembly for appliances or the like, said assembly comprising:
   a pair of brackets adapted to be secured to the appliance,
   each bracket having a leg member freely shiftable vertically relative thereto and engageable with a floor surface beneath the appliance;
   connecting means extending from one bracket to the other and interconnecting said leg members with each other for mutual movement thereof,
   each leg member being free to shift vertically relative to its corresponding bracket and in a reciprocal relationship with its associated member when substantially none of the weight of the appliance is supported thereby; and
   structure incorporated with each bracket and disposed to be in frictional engagement with said connecting means to lock the same and prevent shifting movement of said leg members relative their brackets when both leg members are in contact with the floor in support of at least a portion of the weight of the appliance,
   said connecting means being an elongate, flexible tension element stretched between said two leg members,
   said structure including a longitudinally arcuate element-receiving groove disposed to grip said element when the latter is under tension,
   said element being a cable.

5. A leveling assembly for appliances or the like, said assembly comprising:
   a pair of brackets adapted to be secured to the appliance,
   each bracket having a leg member freely shiftable vertically relative thereto and engageable with a floor surface beneath the appliance;
   connecting means extending from one bracket to the other and interconnecting said leg members with each other for mutual movement thereof,
   each leg member being free to shift vertically relative to its corresponding bracket and in a reciprocal relationship with its associated member when substantially none of the weight of the appliance is supported thereby; and
   structure incorporated with each bracket and disposed to be in frictional engagement with said connecting means to lock the same and prevent shifting movement of said leg members relative their brackets when both leg members are in contact with the floor in support of at least a portion of the weight of the appliance,
   said connecting means being an elongate, flexible tension element stretched between said two leg members,
   said element including a fitting at each end thereof adapted for releasable connection with a corresponding leg member,
   said structure defining an abutment on each bracket located relative its associated fitting to limit the normal downward movement of its corresponding leg member.

* * * * *